United States Patent

Hache et al.

Patent Number: 5,926,529
Date of Patent: Jul. 20, 1999

[54] COMMUNICATION SYSTEM FOR DETECTING AN UNAUTHORIZED INTRUDER TERMINAL UNIT

[75] Inventors: Wilfried Hache, Lehn; Jost Kawczyk, Löbau; Michael Andreas, Kamenz; Axel Kiessling, Bautzen, all of Germany

[73] Assignee: U.S. Philips Corporation, New York, N.Y.

[21] Appl. No.: 08/737,545

[22] PCT Filed: Feb. 29, 1996

[86] PCT No.: PCT/IB96/00153

§ 371 Date: Nov. 12, 1996

§ 102(e) Date: Nov. 12, 1996

[87] PCT Pub. No.: WO96/29811

PCT Pub. Date: Sep. 26, 1996

[30] Foreign Application Priority Data

Mar. 17, 1995 [DE] Germany ............................ 195 09 662

[51] Int. Cl.[6] .................................................. H04M 15/00
[52] U.S. Cl. ................... 379/114; 379/7; 379/27; 379/188; 379/399; 379/412
[58] Field of Search ........................... 379/114, 188–189, 379/191, 193, 195–196, 197–200, 91.01, 91.02, 144–145, 7, 35, 22, 24, 26–27, 31, 33, 387, 412, 399, 442–445, 48, 32, 201

[56] References Cited

U.S. PATENT DOCUMENTS

| 4,760,592 | 7/1988 | Hensley ........................................ 379/7 |
| 4,885,768 | 12/1989 | Genin ......................................... 379/200 |
| 5,086,459 | 2/1992 | Perry .......................................... 379/188 |
| 5,099,515 | 3/1992 | Kobayashi et al. ........................... 379/7 |
| 5,436,959 | 7/1995 | Dake et al. ................................... 379/7 |
| 5,559,874 | 9/1996 | Panosh ...................................... 379/189 |

FOREIGN PATENT DOCUMENTS

| 0266044 | 5/1988 | European Pat. Off. . |
| 2237912 | 5/1991 | United Kingdom . |
| 2274043 | 7/1994 | United Kingdom . |
| 95/35617 | 12/1995 | WIPO . |

Primary Examiner—Paul Loomis
Assistant Examiner—Duc Nguyen
Attorney, Agent, or Firm—Robert J. Kraus

[57] ABSTRACT

The invention relates to a communication system comprising a station (2) for charge metering of a connection point. This station comprises a monitoring circuit (7) for detecting a request for a connection set-up from the connection point (3), either for establishing the absence of a message after a given period of time, or for evaluating the contents of a message that has arrived from the connection point (3) after the request for a connection set-up has arrived, and for rejecting the request for a connection set-up if invalid parameters of the connection point (3) are established.

7 Claims, 1 Drawing Sheet

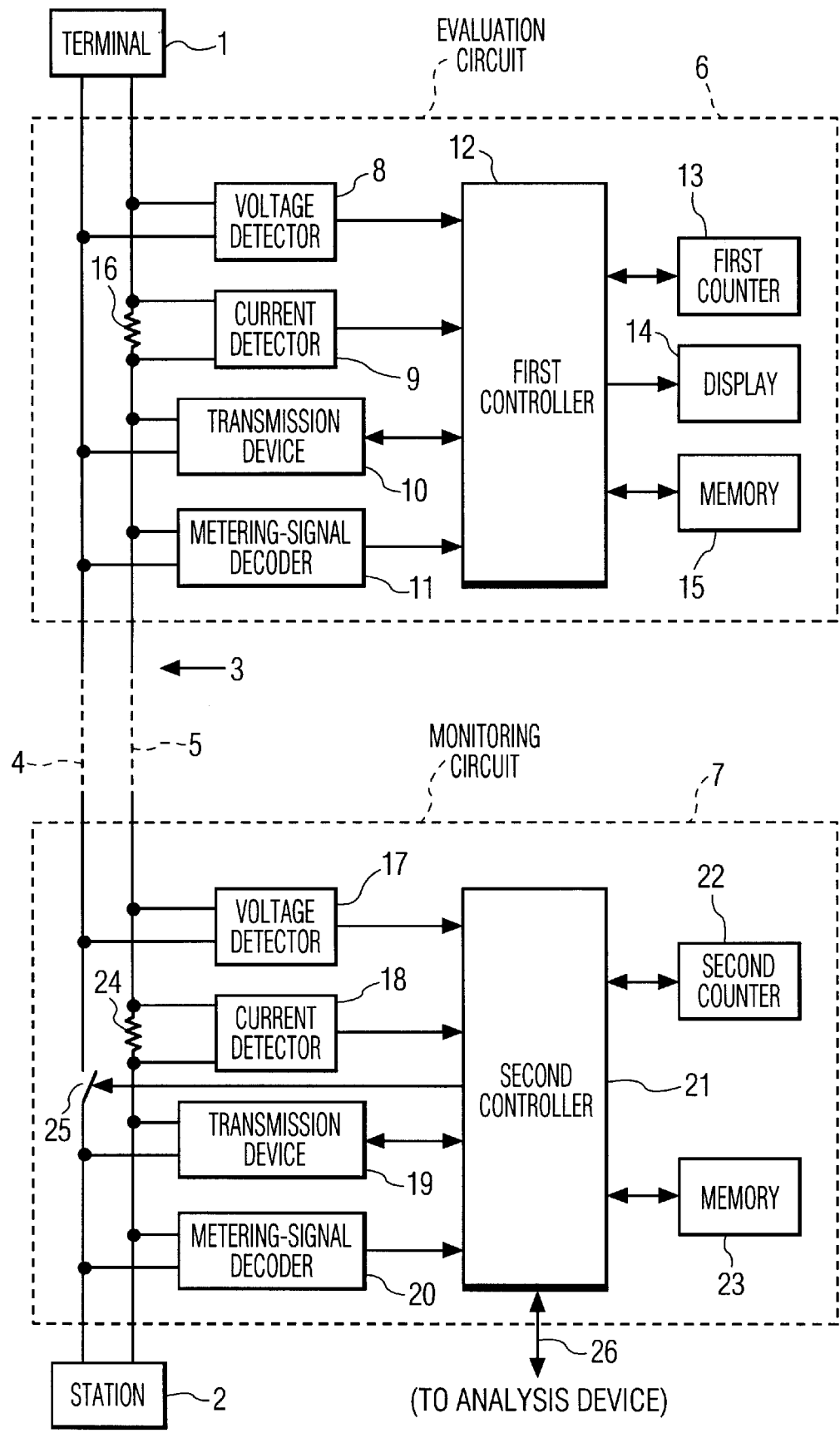

COMMUNICATION SYSTEM FOR DETECTING AN UNAUTHORIZED INTRUDER TERMINAL UNIT

BACKGROUND OF THE INVENTION

The invention relates to a communication system comprising a station for charge metering of a connection point and to terminal units connected to connection points coupled to the station.

In many communication systems it is often not guaranteed that only the authorized subscriber can communicate with other subscribers via his terminal unit. It is possible, for example, that unauthorized connection lines between a terminal unit of the authorized subscriber and the station, which forms, for example, part of a telephone exchange, are manipulated. This damages both the subscriber and the operating company of the network.

SUMMARY OF THE INVENTION

It is therefore an object of the invention to provide a communication system of the type defined in the opening paragraph in which possibilities of manipulation by unauthorized persons are largely avoided.

The object is achieved by a communication system which has the following characteristic features:
The communication system comprises a station for charge metering of a connection point, which station comprises a monitoring circuit for detecting a request for a connection set-up from the connection point, either establishing the absence of a message after a given period of time, or evaluating the contents of a message that has arrived from the connection point after the request for a connection set-up has arrived, and rejecting the request for a connection set-up if invalid parameters of the connection point are established.

The communication system according to the invention comprises in the station which is provided for charge metering of, for example, a call, an additional monitoring circuit assigned to a connection point. The monitoring circuit picks up a request for a connection set-up which is generally sent by an authorized subscriber's terminal unit connected to a connection point. The authorized subscriber's terminal unit may, for example, send a specific message to be analyzed by the monitoring circuit after the request for a connection set-up, so that the monitoring circuit can recognize the authorization. If, after a given period of time after a request for a connection set-up, the monitoring circuit has still not received any message from the terminal unit connected to the connection point, a request for a connection set-up must have been received from a terminal unit of an unauthorized subscriber. If no message from the connection point, or an erroneous message is available, the monitoring circuit establishes an invalid parameter of the connection point and a rejection of the request for a connection set-up follows.

The exchange of specific agreed messages between a connection point and the monitoring circuit, and the check thereof provides that both the authorization of a subscriber terminal is verified and an unauthorized connection set-up is prevented in a simple manner.

The intrusion of an unauthorized terminal unit at the connection point can be prevented if a terminal unit connected to a connection point is assigned an evaluation circuit which sends out an error message to the monitoring circuit after the intrusion has been detected. The monitoring circuit designates the error message as an invalid parameter. The monitoring circuit receives a message from the evaluation circuit that an unauthorized subscriber has intruded while the terminal unit is in the state of rest. Once the message has been received, no connection is set up.

In a further embodiment of the invention, a terminal unit connected to a connection point is assigned an evaluation circuit which comprises a first counter for counting the charge metering signals and a first controller for forming a message which contains a first count of the first counter for the monitoring circuit, and the monitoring circuit comprises a second counter for counting the charge metering signals and a second controller for evaluating the message received from the evaluation circuit and for designating the count of the first counter as an invalid parameter if the counts of the two counters are not the same.

A terminal unit is assigned an evaluation circuit which counts the charge metering signals by a first counter. A second counter in the monitoring circuit also counts these signals. Before the connection is set up, the monitoring circuit is informed of the count of the first counter. The two counts are compared in the monitoring circuit. If there is a difference, an unauthorizedly connected terminal unit will be detected. The terminal unit of the authorized subscriber is in that case disconnected from the connection point. The received message with the count of the first counter is interpreted as an invalid parameter.

The counts of the first and second counters can be stored each time a connection is terminated and compared each time a new connection is set up. The counters can then be reset to an initial value, for example, zero. Alternatively, it is possible for the counters to be allowed to count on.

In above case the terminal unit of the unauthorized subscriber was capable of announcing a count to the monitoring circuit. If the unit cannot possibly do so, the monitoring circuit receives no message from the connection point to which the terminal unit of the unauthorized subscriber is connected. For detecting an unauthorized subscriber, the monitoring circuit then comprises a second controller for sending an identification demand to the connection point after the request for the connection set-up has been detected. If no identification has come in from the connection point after a given period of time, the second controller designates the absence of the message as an invalid parameter. The connection is not set up then.

If an invalid parameter is established, the second controller occurring in the monitoring circuit switches off the connection point. The control circuit can then open a switch in the connection line.

For detecting a request for a connection set-up, both the monitoring circuit and the evaluation circuit include a current detector and a voltage detector. Both the first and second controllers are used for detecting a request for a connection set-up when a specific current measured by the current detector and a specific voltage measured by the voltage detector are found on the connection lines between connection point and station.

Furthermore, the first controller is used for detecting the intrusion of an unauthorized terminal unit at the connection point by evaluating the current measured by the current detector and the voltage measured by the voltage detector.

The invention also relates to a station for charge metering a connection point, which station comprises a monitoring circuit for detecting a request for a connection set-up from the connection point, either establishing the absence of a message after a given period of time, or evaluating the contents of a message that has arrived from the connection point after the request for a connection set-up has arrived, and rejecting the request for a connection set-up if invalid parameters of the connection point are established.

Furthermore, the invention relates to an evaluation circuit which is assigned to a terminal unit connected to a connection point and which is used for sending out an error message after it has detected the intrusion of an unauthorized terminal unit at the connection point.

The evaluation circuit which is assigned to a terminal unit connected to a connection point further includes a first counter for counting charge metering signals and a first controller for forming a message which contains a count of the first counter.

BRIEF DESCRIPTION OF THE DRAWING

An illustrative embodiment of the invention will be further explained with reference to the FIGURE which shows a communication system comprising a terminal unit and a station.

DESCRIPTION OF THE PREFERRED EMBODIMENTS

The FIGURE shows a communication system comprising a terminal unit 1 and a station 2 which is used for charge metering the terminal unit 1 and forms part, for example, of a telephone exchange. It is possible to connect further terminal units to the station 2. The terminal unit 1 is coupled to the station 2 via connection point 3 and connection lines 4 and 5. Station 2 comprises, for example, a generator (not shown) for generating metering signals, a charge meter and a voltage source. If a connection is to be set up from the terminal unit, the voltage flowing between the connection lines 4 and 5 and the current flowing through the connection lines 4 and 5 will change, for example, because the receiver of the terminal unit is lifted. In the station 2 this change is recognized as a request for a connection set-up via voltage and current detectors.

To avoid an unauthorized subscriber linking to the connection point 3, an evaluation circuit 6 arranged in the neighbourhood of terminal unit 1 is inserted between terminal unit 1 and station 2 and so is a monitoring circuit 7 which forms part of station 2. The evaluation circuit 6 is further to be situated in the territory of the operating company of the network. The evaluation circuit 6 could, for example, be arranged in a TAE socket. The connection point 3 lies between evaluation circuit 6 and monitoring circuit 7.

The evaluation circuit 6 includes a voltage detector 8, a current detector 9, a transmission device 10, a metering signal decoder 11, a first controller 12, a first counter 13, a display 14 and a memory 15. The voltage detector 8 measures the voltage between the connection lines 4 and 5 and transfers the measured voltage as a binary value to the first controller 12. The first controller 12 further receives binary values from the current detector 9 which measures via a resistor 16 the current flowing through the connection lines 4 and 5. The transmission device 10 sends messages from the first controller 12 and receives messages from the monitoring circuit 7. The transmission device 10 can produce the messages on the connection lines 4 and 5, for example, as modulated or pulse-shaped signals. The metering signal decoder 11 decodes the charge metering signals occurring during a connection and transfers an information signal about the received metering signal as a binary value to the first controller 12.

The first controller 12, which is arranged, for example, as a microcontroller, evaluates the received binary values and messages and implements measures to be explained hereinafter as a reaction to the received binary values and messages. When the metering signal is received, the first counter 13 is incremented by the first controller 12. After the end of a connection, the count of the first counter 13 is read by the first controller 12 and written in the memory 15 and displayed on the display 14. The first counter 13 is then reset to an initial value. If memory 15 is to be dispensed with, the first counter 13 can also retain its count unchanged.

The monitoring circuit 7 comprises a voltage detector 17, a current detector 18, a transmission device 19, a metering signal decoder 20, a second controller 21, a second counter 22 and a memory 23. The voltage detector 17, the current detector 18, the transmission device 19, the metering signal decoder 20 the second counter 22 and the memory 23 have similar functions to those of circuit elements 8, 9, 10, 11, 13 and 15 in the evaluation circuit 6. The current detector 18, however, measures the current flowing through a resistor 24 inserted in a connection line 4 or 5.

The second controller 21, which is also arranged, for example, as a microcontroller, increments the second counter 22 when a metering signal is received. After the end of a connection, the count of the second counter 22 is read by the second controller 21 and written in the memory 23. The second counter 22 is then reset to an initial value. If memory 23 is to be dispensed with, the second counter 22 can also retain its count unchanged. The second controller further has a connection 26 to an analysis device included in station 2 and not further shown, to which analysis device are to be announced, for example, unauthorized terminal units that intrude.

If the second controller 21 detects a request for a connection set-up, it sends an identification demand to the evaluation circuit 6 via the transmission device 19. The transmission device 10 transfers the identification demand to the first controller 12 which then forms a message with the count of the latest connection. The count has been read either from memory 15 or from counter 13. This message is transmitted to the second controller 21 via the transmission devices 10 and 19. The second controller 21 compares the received count with the count in memory 23 or in the second counter 22. If these counts are the same, the connection can further be set up because the terminal unit 1 of the authorized subscriber has been recognized. The second controller 21 has thus recognized the message with the count of the evaluation circuit 6 as a valid parameter.

If an unauthorized subscriber has disconnected the terminal unit 1 and the evaluation circuit 6 from the connection point 3, switched on his own terminal unit and triggered the set-up of a connection, the monitoring circuit will send out a demand for an identification. If the unauthorized user has not connected an evaluation circuit to the connection lines 4 and 5, the demand for the identification cannot be responded to. After a given period of time after the demand for an identification has been sent, the second controller 21 will break off the connection set-up. The absence of a message after the given period of time is interpreted as an invalid parameter. The connection set-up may be broken off, for example, by opening a switch 25 which is present in a connection line 4 or 5 and is controlled by the second controller 21.

If the unauthorized user has additionally connected an evaluation circuit to the connection lines 4 and 5 (terminal unit 1 and evaluation circuit 6 disconnected from the connecting point 3), and issued a request for a connection set-up, a message containing a count will be sent out after the demand for identification from the monitoring circuit 7. Since the unauthorized user is unfamiliar with the count of the latest call, the comparison in the second controller 21 will present different counts. In that case the connection set-up is also broken off. The second controller 21 has recognized the message containing the incorrect count of the evaluation circuit 6 as an invalid parameter.

An unauthorized user can also connect his terminal unit to the connection point 3 without the terminal unit 1 and the evaluation circuit 6 being disconnected from the connection lines 4 and 5. If the unauthorized terminal unit sends out a request for a connection set-up, there will be established in the evaluation circuit 6 by means of a current and voltage measurement that no characteristic values for a request for a connection set-up from the authorized terminal unit 1 are available. In that case the first controller 12 sends an error message to the monitoring circuit 7. This error message is interpreted as an invalid parameter and thus the set up of the connection is broken off by the second controller 21.

We claim:

1. Communication system comprising:
   a. a station (2) for charge metering of a connection point (3), which station comprises a monitoring circuit (7) for:
   detecting a request for a connection set-up from the connection point (3);
   either establishing the absence of a message after a given period of time or evaluating the contents of a message that has arrived from the connection point (3) after the request for a connection set-up has arrived;
   rejecting the request for a connection set-up if invalid parameters of the connection point (3) are established; and
   b. a terminal unit (1) connected to the connection point (3), said terminal unit being assigned an evaluation circuit (6) which circuit, once it has detected the intrusion of an unauthorized terminal unit at the connection point (3), sends out an error message to the monitoring circuit (7), said monitoring circuit (7) designating the error message as an invalid parameter.

2. Communication system as claimed in claim 1, characterized in that a second controller (21) included in the monitoring circuit (7) sends out a demand for an identification to the connection point (3) after the request for a connection set-up has been detected and in that, if a message from the connection point (3) is absent after a given period of time, the second controller (21) designates the absence of the message as an invalid parameter.

3. Communication system as claimed in claim 1, characterized in that a second controller (21) included in the monitoring circuit (7) disconnects the connection point (3) if it establishes the reception of an invalid parameter.

4. Communication system as claimed in claim 1, characterized in that a current detector (9, 18) as well as a voltage detector (8, 17) occur both in the monitoring circuit (7) and in the evaluation circuit (6), and in that both the first and second controllers (12, 21) establish a request for a connection set-up if a certain current measured by the current detector (9, 18) and a certain voltage measured by the voltage detector (8, 17) is detected on the connection lines (4, 5) between connection point (3) and station (2).

5. Communication system as claimed in claim 1, characterized in that the first controller (12) establishes a intrusion of an unauthorized terminal unit at the connection point (3) via an evaluation of the current measured by the current detector (9) and the voltage measured by the voltage detector (8).

6. Communication system comprising:
   a. a station (2) for charge metering of a connection point, which station comprises a monitoring circuit (7) for:
   detecting a request for a connection set-up from the connection point (3);
   either establishing the absence of a message after a given period of time or evaluating the contents of a message that has arrived from the connection point (3) after the request for a connection set-up has arrived;
   rejecting the request for a connection set-up if invalid parameters of the connection point (3) are established; and
   b. a terminal unit (1) connected to the connection point (3) is assigned an evaluation circuit (6) which comprises a first counter (13) for counting metering signals and a first controller (12) for forming a message containing a count of the first counter (13) for the monitoring circuit (7), said monitoring circuit (7) comprising a second counter (22) for counting the metering signals and a second controller (21), which second controller evaluates the message that has arrived from evaluation circuit (6) and designates the count of the first counter (13) as an invalid parameter if the two counts of the two counters differ.

7. Station (2) for charge metering of a connection point (3), which station comprises a monitoring circuit (7) for:
   detecting a request for a connection set-up from the connection point (3),
   either establishing the absence of a message after a given period of time or evaluating the contents of a message that has arrived from the connection point (3) after the request for a connection set-up has arrived, and
   rejecting the request for a connection set-up if invalid parameters of the connection point (3) are established;
   one of said invalid parameters comprising an error message sent by an evaluation circuit to the connection point (3) upon the detection of the intrusion of an unauthorized terminal unit at the connection point.

* * * * *